(12) United States Patent
Dai et al.

(10) Patent No.: US 10,599,137 B2
(45) Date of Patent: Mar. 24, 2020

(54) SAFETY CONTROL SYSTEM AND METHOD OF OPERATION OF A SAFETY CONTROL SYSTEM

(71) Applicant: ABB AG, Mannheim (DE)

(72) Inventors: Fan Dai, Zwingenberg (DE); Bjoern Matthias, Bad Schoenborn (DE); Hao Ding, Heidelberg (DE); Christoph Byner, Mannheim (DE); Yauheni Veryha, Mannheim (DE)

(73) Assignee: ABB AG, Mannheim (DE)

( * ) Notice: Subject to any disclaimer, the term of this patent is extended or adjusted under 35 U.S.C. 154(b) by 242 days.

(21) Appl. No.: 15/665,470

(22) Filed: Aug. 1, 2017

(65) Prior Publication Data

US 2017/0329321 A1     Nov. 16, 2017

Related U.S. Application Data

(63) Continuation of application No. PCT/EP2016/054097, filed on Feb. 26, 2016.

(30) Foreign Application Priority Data

Mar. 4, 2015 (EP) .................................. 15157511

(51) Int. Cl.
*G05B 23/02* (2006.01)
*B25J 9/16* (2006.01)
(Continued)

(52) U.S. Cl.
CPC ........ *G05B 23/0291* (2013.01); *B25J 9/1674* (2013.01); *F16P 3/14* (2013.01);
(Continued)

(58) Field of Classification Search
CPC .............. G05B 23/0291; G05B 19/048; G05B 19/406; G05B 9/02; B25J 9/1674; F16P 3/14; F16P 3/142; F16P 3/144
(Continued)

(56) References Cited

U.S. PATENT DOCUMENTS

2016/0040827 A1     2/2016   Merx

FOREIGN PATENT DOCUMENTS

DE       102005003827 A1      7/2006
DE       102013104265 A1     10/2014
(Continued)

*Primary Examiner* — Mohammad Ali
*Assistant Examiner* — Joshua T Sanders
(74) *Attorney, Agent, or Firm* — Leydig, Voit & Mayer, Ltd

(57) ABSTRACT

A safety control system has a control unit with safety control logic, a safety sensor arrangement, a machine arrangement operable in different operation modes, each operation mode having a different productivity, the control unit receiving and evaluating input from the safety sensor arrangement, and, in reaction to evaluation result(s), activating an operation mode determined by the safety control logic, the safety sensor arrangement having at least two functionally redundant subsystems, control unit input including information indicating availability of the functionally redundant subsystems, the control logic being configured to activate normal operation mode with normal productivity if input indicates availability of all subsystems, activate fail-stop operation mode with zero productivity if input indicates unavailability of all subsystems, activate fail-operate operation mode with productivity less than normal but above zero if input indicates at least temporary unavailability of at least one and availability of at least another one of the subsystems.

20 Claims, 9 Drawing Sheets

(51) Int. Cl.
*G05B 19/048* (2006.01)
*F16P 3/14* (2006.01)
*G05B 9/02* (2006.01)
*G05B 19/406* (2006.01)

(52) U.S. Cl.
CPC ............... *F16P 3/142* (2013.01); *F16P 3/144* (2013.01); *G05B 9/02* (2013.01); *G05B 19/048* (2013.01); *G05B 19/406* (2013.01); *G05B 2219/50198* (2013.01)

(58) Field of Classification Search
USPC .......................................................... 700/21
See application file for complete search history.

(56) References Cited

FOREIGN PATENT DOCUMENTS

| | | | |
|---|---|---|---|
| EP | 2637068 | A1 | 9/2013 |
| EP | 2783798 | A2 | 10/2014 |
| JP | 2007283450 | A | 11/2007 |
| JP | 2007293450 | A * | 11/2007 |
| WO | WO 2009040137 | A1 | 4/2009 |

* cited by examiner

SAFETY CONTROL SYSTEM AND METHOD OF OPERATION OF A SAFETY CONTROL SYSTEM

CROSS-REFERENCE TO RELATED APPLICATIONS

This application is a bypass continuation of International Application No. PCT/EP2016/054097, filed on Feb. 26, 2016, and claims benefit to European Patent Application No. DE 15 157 511.5, filed on Mar. 4, 2015, the entire disclosure of each of which is incorporated by reference herein. The International Application was published in English on Sep. 9, 2016, as WO 2016/139147 A1 under PCT Article 21(2).

FIELD

The present invention relates to a safety control system.

BACKGROUND

Safety control in discrete manufacturing has the primary goal of protecting humans against hazards, when working at or entering manufacturing sites. Basically, sensors or switches are used to inform a safety control device about the presence of humans in specific zones, or their attempt to enter such zones. Based on the actual status of the automated manufacturing process, the manufacturing line or individual devices are put into a state that reduces or limits potential hazards to a specified, acceptable range. Very often, this is achieved by stopping the machines, but sometimes it is also sufficient to reduce the speed of motion, or limit the space of movements of particular mechanisms, e.g. industrial robots or machine tools.

In the major cases, stopping the machine is implemented, while drives with safe stopping function (STO) are used. In case of industrial robots, the robot controller also does the safety control of the robot, where supervision of robot tool position and speed is commonly implemented. It is also known to use drives offering safety speed or position control.

In case of (potential) severe hazards, an emergency stop is issued, e.g. via an emergency stop button, or corresponding sensor devices. It brings the machine into a safe stop state, which needs dedicated confirmation to restart the machine.

The safety control for achieving its primary goal of protecting humans against hazards is relying on the availability of proper functioning of sensors and switches.

But sensors and switches might fail, for example in case an internal diagnostic function detects a power supply failure. Or the communication between the sensors or switches and the control logic can be faulty. When implementing safety control, therefore the control logic needs to have a safety concept for dealing with situations when the sensors or switches are not available, for example in case of an internal stop, which can be also called passivation.

Another reason may be when the communication between the sensors and switches and the control logic is in a faulty state. Passivation, or in other words unavailability of sensors or switches or disturbed communication between sensors or switches and the control logic is summarized under the term "failure situation", to be distinct from the "hazard situation" explained earlier.

The control logic comprises a pre-defined reaction in such a failure situation as well.

In the known state of the art, the reaction to a failure situation is the same as the reaction to a hazard situation. So in case a faulty communication to a safety sensor or a failure in the sensor device itself is detected, a corresponding emergency function mode is activated, even if no hazard situation has been detected. This is a machine stop according to stop category 0 or 1 combined with manual resetting/restart of the machine. The productivity of the machine is reduced.

But often, a failure situation, for example the unavailability of the sensor, is only temporary, and is resolved more or less automatically within a certain time. In the state of the art, the machine is stopped anyway, causing unnecessary production losses.

SUMMARY

An aspect of the invention provides a safety control system, comprising: a control unit including safety control logic; a safety sensor arrangement; a machine arrangement operable in different modes of operation, wherein each mode of operation includes a different productivity of the machine arrangement, wherein the control unit is configured to receive and evaluate input from the safety sensor arrangement, and, in reaction to a result of the evaluation activates at least one of the modes of operation of the machine arrangement as determined by the safety control logic, wherein the safety sensor arrangement includes a first and a second subsystem, which are functionally redundant, wherein input to the control unit includes information indicating availability of the functionally redundant subsystems, wherein the control logic is configured to (i) activate a normal mode of operation ($F_N$) characterized by normal productivity ($P_N$) in case the input indicates availability of all functionally redundant subsystems, (ii) activate a fail-stop mode ($F_0$) of operation characterized by zero productivity ($P_0$) in case the input indicates unavailability of all functionally redundant subsystems, and (iii) activate a fail-operate mode ($F_1$, $F_2$) of operation with productivity less than normal but above zero in case input indicates at least temporary unavailability of at least one and availability of at least another one of the functionally redundant subsystems.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
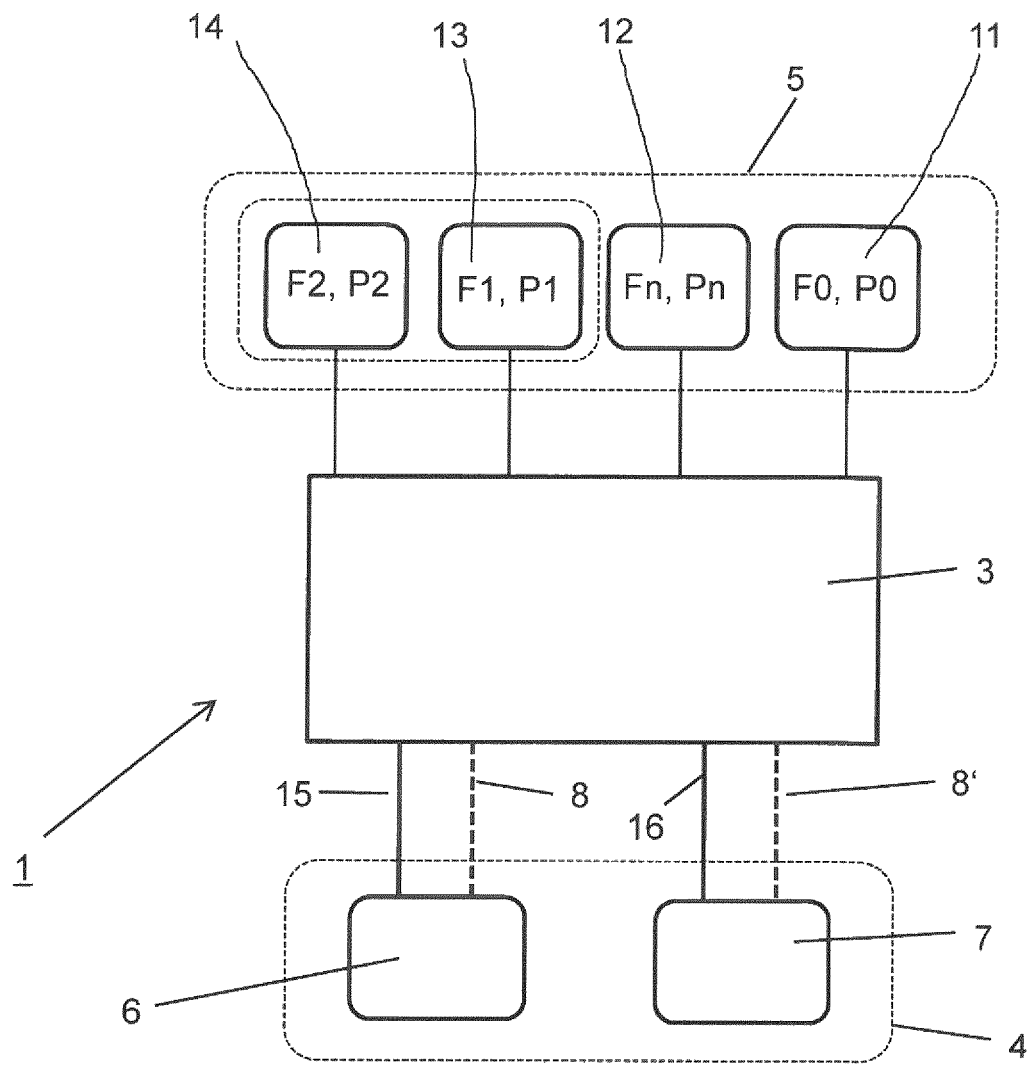
FIG. 1 is an exemplary and schematic representation of a safety control system according to the invention.

An aspect of the invention provides a safety control system, the system including a control unit which includes safety control logic, further including at least one safety sensor arrangement, further including at least one machine arrangement, which is operable in different modes of operation, wherein each mode of operation is characterized by a different productivity of the machine arrangement, whereby the control unit receives and evaluates input from the at least one safety sensor arrangement, and in reaction to the result of the evaluation activates a mode of operation of the machine arrangement as determined by the safety control logic.

An aspect of the present invention also provides a method of operation of a safety control system, the system including a control unit which includes safety control logic, further including at least one safety sensor arrangement, further including at least one machine arrangement, which is operable in different modes of operation, wherein each mode of operation is characterized by a different productivity of the machine arrangement, whereby the control unit receives and evaluates input from the at least one safety sensor arrangement, and in reaction to the result of the evaluation activates a mode of operation of the machine arrangement as determined by the safety control logic.

Generally speaking, an aspect of the invention provides safety control in a discrete manufacturing environment or a manufacturing site. The term "machine" is meant to comprise any individual machine or sub-system of a manufacturing site, for example a robot, an assembly machine, a manufacturing cell or even an automated guided vehicle (AGV) used within manufacturing sites to automatically move between different manufacturing cells or subsystems.

An aspect of the invention improves a safety control system and a method for operating of a safety control system for controlling a machine in such a way, that in case of a failure situation as described above production losses are reduced.

An aspect of the invention provides an improvement of the safety control system, the at least one safety sensor arrangement having at least two functionally redundant subsystems, and input to the control unit includes information indicating availability of the at least two functionally redundant subsystems, whereby the control logic is configured to activate a normal mode of operation characterized by normal productivity in case the input indicates availability of all functionally redundant subsystems, and is configured to activate a fail-stop mode of operation characterized by zero productivity in case the input indicates unavailability of all functionally redundant subsystems, and is configured to activate a fail-operate mode of operation with productivity less than normal but above zero in case input indicates at least temporary unavailability of at least one and availability of at least another one of the functionally redundant subsystems.

For the functionally redundant subsystems of the safety sensor arrangement here in this application in addition also the term first and second safety device is used. It can be two or more safety sensor devices, for example a proximity sensor observing a first safety zone, which is a more critical safety zone, and a camera observing a second or second or third or Nth safety zones, which are less critical, whereby the first safety zone is a subset of the second or third or Nth safety zone. It can as well be one sensor unit having two or more different observation zones, for example a laser scanner or a camera being configured to observe a first safety zone close to the machine arrangement with a high resolution and a second or third or Nth safety zone reaching out further away from the machine arrangement with less resolution or the like. So the term first and second safety device is used to describe either a sensor or sensor system or a functional sub-unit of a more complex sensor or sensor system. The term "second safety device" is meant to mean a functional kind, so a second safety device is meant to mean one or two or three or N sensors or sensing functions in addition to the first sensor device.

For the term "first or second fail-operate mode" in the context of this application in addition also the term "first or second safety function mode" is used. In other words, the invention provides a safety control system which has a second safety device for detecting a second hazard situation in a second safety zone or, alternatively, is able to achieve some temporarily safe state, for example with safety limited speed, which usually has to be left after a certain pre-defined time. In case of a second safety device, the control logic interacts with the first and second safety devices to detect a failure situation in one of the safety devices and in response to a failure situation in one of the safety devices to switch to the other safety device or to apply one of the failure function modes. In the second case, the control logic brings the system in some temporarily safe state, which usually has to be left after a certain pre-defined time.

According to a preferred embodiment, the safety control system includes a machine or machine arrangement, having a nominal productivity, further including a first safety zone and a second safety zone, whereby the first safety zone is a subset of the second safety zone, further including a first functionally redundant subsystem being configured for detecting a first hazard event in the first safety zone, further including a second functionally redundant subsystem being configured for detecting a second hazard event in the second safety zone, wherein a first fail-operate mode results in a first reduced machine productivity greater than zero but smaller than the normal productivity, and a second fail-operate mode results in a second reduced machine productivity greater than zero but smaller than the nominal productivity and higher than the first reduced machine productivity, wherein the control logic activates the second fail-operate mode in case input to the control logic indicates availability of both functionally redundant subsystems and indicates a second hazard event in the second safety zone but no hazard event in the first safety zone, and wherein the control logic activates the first fail-operate mode in case input to the control logic indicates a temporarily unavailability of the first functionally redundant subsystem but availability of the second functionally redundant subsystem and indicates a second hazard event in the second safety zone.

According to a further preferred embodiment the control logic activates the second fail-operate mode in case input to the control logic indicates availability of the first functionally redundant subsystem and at least temporary unavailability of the second redundant subsystem and indicates no first hazard event in the first safety zone.

According to a further preferred embodiment the control logic activates the first fail-operate mode in case input to the control logic indicates at least temporary unavailability of the second redundant subsystem and indicates a first hazard event in the first safety zone.

According to a further preferred embodiment the control logic activates the first fail-operate mode in case input to the control logic indicates availability of both the first and second redundant subsystems and indicates a first and a second hazard event in both the first and second safety zones.

According to a further preferred embodiment the control logic activates the normal mode of operation in case input to the control logic indicates availability of the second redundant subsystem and temporary unavailability of the first redundant subsystem and no hazard event in the second safety zone.

According to a further preferred embodiment the machine or the machine arrangement is a robot or an Autonomous Guided Vehicle (AGV) or a discrete manufacturing system or a manufacturing cell.

According to a further preferred embodiment the productivity of the machine or the machine arrangement is the speed of moving parts of the machine or the machine arrangement.

According to a further preferred embodiment the first or the second redundant subsystem is a proximity sensor or a light barrier or a laser scanner or a camera.

According to a further preferred embodiment, temporary unavailability of a functionally redundant subsystem is caused by a temporary communication error like a cyclic redundancy error (CRC error) or a watchdog error.

So according to the invention, the objective is achieved by introducing a fail-over concept to safety control, which avoids unnecessary machine stops in cases where there is a failure situation in a safety device. Fail-over means switching to a redundant device or function when a dedicated device or function fails.

In the hierarchical safety control system according to the invention, the hierarchy in the order of increasing critically is given by the sequence of the second, or third or in a generic case Nth, less critical safety zone(s), supervised by the second safety device and detecting a second, or third or in a generic case Nth, hazard situation(s) in the second, or third or in a generic case Nth, safety zone(s), triggering a second, or third or in a generic case Nth, safety function mode(s), which is not stopping the machine, and the subsequent first, critical safety zone supervised by the first safety device and detecting a first hazard situation in the first, critical safety zone, triggering a first safety function mode, which preferably is stopping the machine. So the hierarchically arranged first and second safety devices are according to the invention used as if they were redundant devices.

When it comes to the reaction of the safety control system to a failure mode in one of the safety devices, i.e., sensors or switches or the like, the advantage of the safety control system according to the present invention is that in such a failure mode the control logic does not trigger the emergency function mode, but switches to the other safety device and applies a failure function mode (instead of the severe emergency function mode), selecting from two failure function modes the less critical one which still fulfills safety requirements. This is seen from the invention in that in case the second safety device is in a failure situation, the first safety device is used instead of the second safety device, but the less critical second safety function mode is applied. This is a surprising finding, as the normal way would be to apply the more critical first safety function together with the first safety device. Advantage of the invention is that by using the less critical second safety function, the productivity of the machine is less reduced as compared to applying the critical first safety function, but still keeping up a high and reasonable level of safety.

In other words, a typical hazard event is that a human enters a defined zone where an operating machine may harm the human seriously. Traditionally, if such an event is detected, the machine is stopped.

The concept of hierarchical safety control takes into account that the severity of such a hazard can be differently so that sometime the machine can run at a safely reduced speed instead of stopping, so that the overall productivity of the machine can be enhanced.

For example, one can define a "Zone 1" around an industrial robot, where the violation of this zone leads to stopping the robot immediately, but if the human is in the neighborhood outside this zone, the robot can run at a reduced speed, so that the robot is able to stop, when human enters "Zone 1". This is an example for a hierarchical control structure according to the invention.

Another example could be an AGV which could run with reduced speed, if obstacles or human worker is within certain, but larger range, and it stops, when the distance becomes critical, like "Zone 1" in the above example.

In a more general manner, the safety reaction can also depend on more accurate sensing of position, size and velocity of human or obstacles. And the safety reaction can also be stopping certain part of a production line, running on variable speed with parts of the line etc.

First or second safety devices may have first or second safety hazard detection means, which for example can be sensors or switches, which are used to inform a safety logic, also called safety control device, about the presence of a human in specific zones, or their attempt to enter such zones. For example, a near-range environment around a machine, for example a robot or an AGV, can be defined as a first, critical safety zone, because there is a critical danger that a human gets seriously hurt by the machine when he enters this first zone. So the presence of a human in such a first, critical zone is an example for a hazard event according to the present invention.

A wider range environment around the machine, for example the robot or the AGV, would be defined as a second, less critical safety zone. Here there still is some risk that a human gets injured when within this zone, but it is less likely and there is a larger security distance to the dangerous parts of the machine with more reaction time. So the presence of a human in such a second safety zone is also regarded as a hazard event according to the present invention, but will have less severe consequences.

The first safety zone usually is a subset of the second safety zone.

Based on the actual status of the automated manufacturing process, upon detection of a hazard event, the manufacturing line or individual devices are triggered for executing a first or second safety function. This means, that for example they are put into a state that reduces or limits potential hazards to a specified, acceptable range. Very often, this is achieved by stopping the machines, but sometimes it is also sufficient to reduce the speed of motion, or limit the space of movements of particular mechanisms, e.g. industrial robots or machine tools.

A first safety function would mean, for example, a quite drastic reduction of speed of motion or limitation of the space of movements, and would be triggered in case a human is detected to be within the first safety zone.

A second safety function would mean, for example, a less drastic reduction of speed of motion or limitation of the space of movements, and would be triggered in case a human is detected to be within the second, less critical safety zone.

According to a further preferred embodiment of the present invention, the safety control logic interacts with the machine arrangement to trigger the machine arrangement to the normal function mode in case of occurrence of a failure with the first safety device, and in absence of a hazard situation being detected by the second safety device.

According to a further preferred embodiment of the present invention, the safety control logic interacts with the machine to trigger the machine to the first function mode in case of occurrence of a failure situation with the first safety device and detection of a hazard situation by the second safety device.

According to a further preferred embodiment of the present invention, the control logic interacts with the machine to trigger the machine to the first safety function mode in case of occurrence of a failure situation with the second safety device and detection of a hazard situation by the first safety device.

According to a further preferred embodiment of the present invention, the control logic interacts with the machine to trigger the machine to the emergency safety function mode in case of occurrence of a failure situation with the first and second safety devices.

According to a further preferred embodiment of the present invention, the control logic interacts with the first and second safety devices to detect communication errors with the first and second safety devices, the failure situation in one of the safety devices being the communication error, for example a CRC or Cyclic redundancy Check error or watchdog error.

According to the invention, a method of operation of a safety control system, said system including a control unit which includes safety control logic, further including at least one safety sensor arrangement, further including at least one machine arrangement, which is operable in different modes of operation, wherein each mode of operation is characterized by a different productivity of the machine arrangement, whereby the control unit receives and evaluates input from the at least one safety sensor arrangement and in reaction to the result of the evaluation activates a mode of operation of the machine arrangement as determined by the safety control logic, wherein the at least one safety sensor arrangement has at least two functionally redundant subsystems, wherein input to the control unit includes information indicating availability of the at least two functionally redundant subsystems, is characterized by the steps of activation of a normal mode of operation characterized by normal productivity in case the input indicates availability of all functionally redundant subsystems, and activation of a fail-stop mode of operation characterized by zero productivity in case the input indicates unavailability of all functionally redundant subsystems, and activation of a fail-operate mode of operation with productivity less than normal but above zero in case input indicates at least temporary unavailability of at least one and availability of at least another one of the functionally redundant subsystems.

So concerning a method of operation of a safety control system for controlling a machine, said system having a hierarchical safety control structure with a control logic, a first safety device for detecting a first hazard situation in a first safety zone and in response to that triggering a first safety function mode, a second safety device for detecting a second hazard situation in a second safety zone and in response to that triggering a second safety function mode, the invention teaches that the method comprises the following steps:

the control logic detects if there is a failure situation in one of the safety devices;
if there is a failure situation in one of the safety devices, the control logic switches to the other safety device or applies one of the failure function modes.

According to a further preferred embodiment of the present invention, the machine is being operable at least in a normal function mode and in an emergency function mode, the safety control system having a control logic communicatively coupled to the machine, a first safety device, communicatively coupled to the control logic, the control logic using the first safety device for detecting a first hazard situation in a first, critical safety zone, a second safety device communicatively coupled to the control logic, the control logic interacting with the machine in a way to operate in normal function mode in absence of a hazard situation, with the further steps:

the control logic uses the second safety device instead of the first safety device in case that a failure situation has been detected with the first safety device, and the control logic triggers the second safety function mode in case that a failure situation has been detected with the second safety device and no hazard situation has been detected by the first safety device.

According to a further preferred embodiment of the present invention, the method comprises the further step that the safety control logic triggers the normal function mode in case that a failure situation has been detected with the first safety device, and no hazard situation has been detected by the second safety device.

According to a further preferred embodiment of the present invention the method comprises the further step that the control logic triggers the first function mode in case that a failure situation has been detected with the first safety device and a hazard situation has been detected by the second safety device.

According to a further preferred embodiment of the present invention the method comprises the further step that the control logic triggers the first safety function mode in case that a failure situation has been detected with the second safety device and a hazard situation has been detected by the first safety device.

According to a further preferred embodiment of the present invention the method comprises the further step that the control logic triggers the emergency safety function mode in case that a failure situation has been detected with the first and second safety devices.

FIG. 1 shows an exemplary and schematic representation of a safety control system according to the invention. The safety control system 1 includes a control unit 3 which includes safety control logic. The control unit 3 receives input from a process via a process sensor arrangement 4. The process can be any technical process, for example a manufacturing cell, a robot or a robot system with several robots, or an autonomous guided vehicle (AGV), or a chemical process plant or a subsystem of a chemical process plant or the like. The term process is in the context of this invention here thus as well used to describe a machine.

The process or machine has certain safety critical zones which are surveyed by the safety sensor arrangement 4. This will be explained in more detail below in the context of FIGS. 2, 3, 4 and 7a-c.

The control unit 3 receives signals containing information from the safety sensor arrangement 4, and evaluates the input received. For this purpose, the control unit 3 includes at least one input/output unit (I/O-unit). The safety control logic arranges for the evaluation of the information received at the input and generation of respective output signals containing respective output information to the process or machine, here in FIG. 1 schematically represented as machine arrangement 5. The machine arrangement 5, or machine or process, is operable in different modes of operation. For example, if the machine arrangement is an AGV, the different modes of operation can be different speeds, ranging from zero or stop, slow speed, a bit faster speed, normal speed. The same holds if the machine arrangement is a robot with at least one robot arm. Here the different modes of operation can as well be speed of movement of the robot arm or arms or even the area covered by the robot arm or arms, ranging from standstill via only a small segment, a larger segment to the full operation zone. Each mode of operation is associated with a certain productivity of the machine or machine arrangement or process. So for example if the robot stands still, productivity is zero. If it moves only slowly, productivity is low. If it moves with normal speed, productivity is normal.

The examples given above with the robot or the AGV are for exemplary example only. It is understood, that for all kind of processes, including but not limited to, manufacturing processes with various other kinds of machines or chemical production processes, in an equivalent way different modes of operation with assigned different productivities can be defined.

In FIG. 1 the above explained is in an abstract manner illustrated as a machine arrangement 5, the modes of operation are indicated schematically as functional blocks or subsystems $F_0$ with numeral 11, $F_N$ with numeral 12, $F_1$ with numeral 13, $F_2$ with numeral 14. Each functional block or subsystem is assigned a specific productivity. Function block or subsystem $F_0$ is characterized by productivity $P_0$, function block or subsystem $F_N$ is characterized by productivity $P_N$, function block or subsystem $F_1$ is characterized by productivity $P_1$, function block or subsystem $F_2$ is characterized by productivity $P_2$. Productivity $P_N$ is the normal productivity. Productivity $P_0$ is zero productivity, equivalent to a system stop. Productivity $P_1$ is lower than normal productivity $P_N$, but larger than zero. Productivity $P_2$ is larger than $P_1$, but smaller than normal productivity $P_N$.

The safety sensor arrangement 4 has two functionally redundant subsystems 6, 7. It could be even more than two. The function of the safety sensor arrangement 4 is surveillance of safety zones in the process, or in proximity to a machine or machine arrangement 5. Surveillance means that the safety sensor arrangement 4 with the functionally redundant subsystems 6, 7 detects potentially hazardous events $H_1$, $H_2$ in the safety zones. A hazard event can be for example an obstacle in the path of tan AGV or a human person within the operation zone of a robot or robot system within reach of the robot arm or arms. Functionally redundant means, that both subsystems 6, 7 can redundantly be used for safety surveillance or detection of such hazard events. This can for example mean that there are two safety zones around the machine 5, a critical one and a less critical one. The critical safety zone is for example characterized in that there is a high potential danger for the machine if an obstacle is within this zone, or there is a high potential safety risk for a human person potentially residing within this zone.

So functionally redundant subsystems can for example be two subsystems surveying different safety zones each. This can be realized by one sensor having two or more modes of surveillance for different zones, or by two different sensors, one for the first zone, and one for the other zone.

Each of the functionally redundant subsystems 6, 7 transmits information concerning presence or absence of a hazard event within its surveillance area to the control unit 3, using first signal input lines 15, 16. And in addition each of the functionally redundant subsystems 6, 7 transmits information concerning its availability to the control unit 3, using availability indicating input lines 8, 8'. Availability of a functional redundant subsystem of the sensor arrangement 4 can be limited or lacking either due to malfunction of the subsystem 6, 7 itself, or due to disturbed communication between the subsystem 6, 7 and the control unit 3.

Lacking availability of a safety sensor subsystem is a potential safety risk. Therefore in traditional safety control systems, as soon as availability of a safety sensor arrangement or safety sensor subsystem is not given any more, the related functional block or subsystem in the machine arrangement will be set to emergency stop, meaning zero productivity. In a significant number of cases, this would not be necessary, as the availability of the respective safety sensor or safety sensor subsystem gets restored automatically after a short time.

Therefore in the safety control system 1 according to the invention as shown in FIG. 1, the control logic 3 is configured to activate a normal mode of operation $F_N$ characterized by normal productivity $P_N$ in case the input indicates availability of all functionally redundant subsystems 6, 7, and is configured to activate a fail-stop mode $F_0$ of operation characterized by zero productivity $P_0$ in case the input 8 indicates unavailability of all functionally redundant subsystems 6, 7, and is further configured to activate a fail-operate mode $F_1$, $F_2$ of operation with productivity less than normal but above zero in case input 8 indicates temporary unavailability of at least one and availability of at least another one of the functionally redundant subsystems 6, 7. So only in case all subsystems are not available, the fail stop mode with zero productivity is activated. In case of temporary unavailability of one of the subsystems, as long as at least one of the redundant subsystems is available, the machine arrangement will be set to a state of reduced productivity only, not zero, which increases to a large extent the overall availability of the safety-controlled machine arrangement 5.

Figure 2:
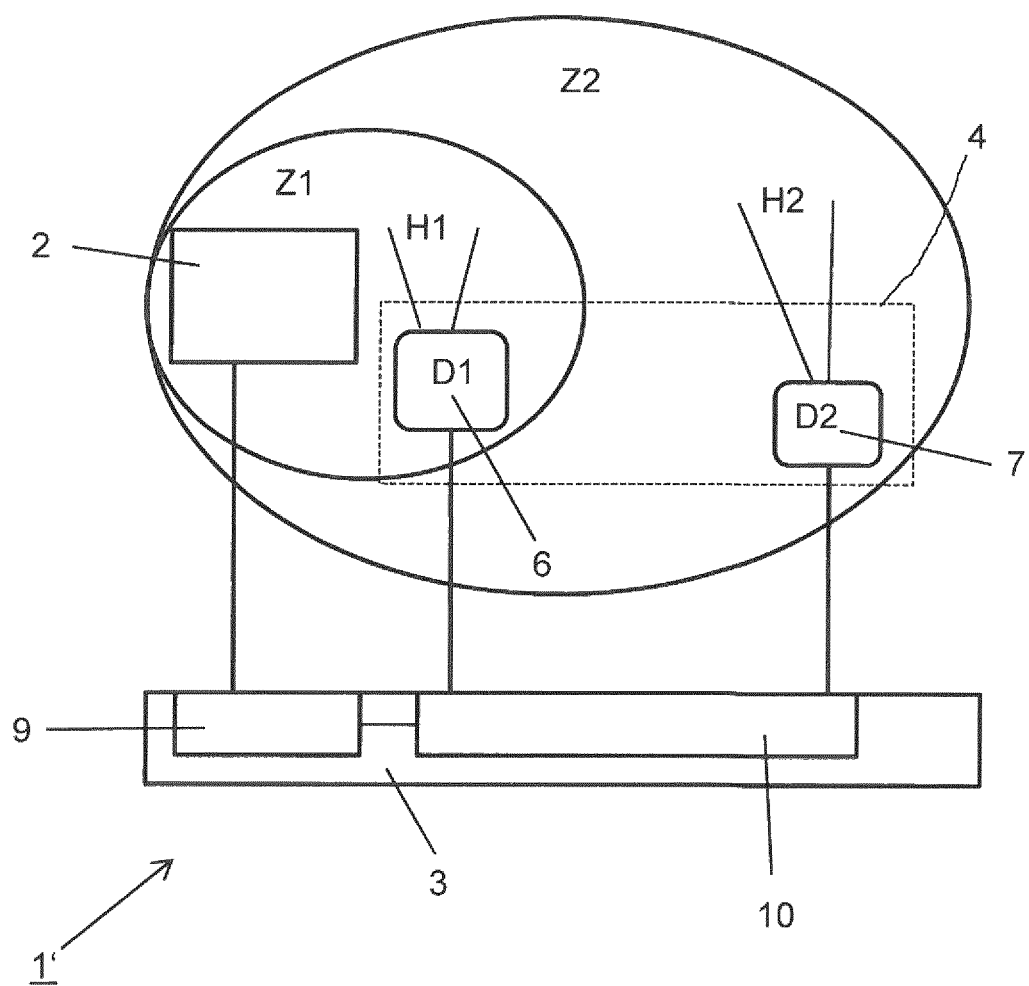
FIG. 2 is an exemplary and schematic representation of a further embodiment of a safety control system according to the invention.

Looking now at FIG. 2, this shows an exemplary and schematic representation of a further embodiment of a safety control system 1' according to the invention. FIG. 2 schematically shows a safety control system 1' for controlling a machine 2. The machine 2 may be a robot, an AGV, or any other machine used in a discrete manufacturing system or manufacturing cell. Related to the machine 2 there are defined a first, critical safety zone $Z_1$ and a second, less critical safety zone $Z_2$. The first safety zone $Z_1$ is being located closer to the machine 2 than the second safety zone $Z_2$. The first, critical safety zone Z1 is a subset of the second, less critical safety zone $Z_2$.

The safety control system 1 further comprises a control unit 3 which includes a safety logic and which is communicatively linked to the machine 2. There is further a first safety device $D_1$, reference numeral 6, which is communicatively linked to the safety logic 3. It has a first hazard detecting means configured for detecting a hazard event $H_1$ in the first safety zone $Z_1$. There is further a second safety device $D_2$, reference numeral 7, communicatively linked to the safety logic 3. It has second hazard detecting means configured for detecting a hazard event $H_2$ in the second safety zone $Z_2$. Safety devices 6, 7 with hazard detecting means can be any kind of sensors known to be used for this purpose, for example proximity sensors, light barrier, laser scanner or the like. Safety devices 6, 7 are examples for what the more general and abstract term" functionally redundant sensor subsystems 6, 7, of a safety sensor arrangement 4" means. Here in FIG. 2 the first and second hazard detection means 6, 7, together form a kind of virtual safety sensor arrangement 4.

The machine 2 includes further a first actuator system having first safety function means configured to be triggered for executing a first safety function by the safety logic 3.

The machine 2 includes further a second actuator system having second safety function means configured to be triggered for executing a second safety function by the safety logic 3.

The first and second actuator systems may be, for example, the drives for the robot axis, or the drives for driving the AGV, or the like. Safety functions in this example would then be for example different drive speeds, the emergency function would in this example be the stop of the drives.

The control unit 3 further has input evaluation means 10 being configured to determine the functional status and/or availability of the first and second safety devices 6, 7. The control unit 3 further has activation means 9 being configured for, in case of functioning and availability of the first and second safety devices 6, 7, triggering or activating the first actuator system for executing the first safety function upon detecting of a hazard event in the first safety zone $Z_1$, triggering or activating the second actuator system for executing the second safety function upon detecting a hazard event in the second safety zone $Z_2$. Input evaluation means 10 and activation means 9 may be implemented, for example, as I/O devices and associated program routines as part of a control operating program stored in memories within and executed by a microcomputer as part of the control unit 3 and its control logic.

The activation means 9 are configured for triggering or activating the first actuator system for executing the first safety function $F_1$ upon determination of malfunction and/or unavailability of the first safety device 6 and function and availability of the second safety device 7, and upon detecting a hazard event in the second safety zone $Z_2$.

The activation means 9 are further configured for triggering or activating the second actuator system for executing the second safety function $F_2$, in case the input evaluation means 10 determine a malfunction and/or unavailability of the second safety device 7 and determine functioning and availability of the first safety device 6, as long as the first safety means or hazard detection means 6 do not detect a hazard in the first safety zone $Z_1$.

The activation means 9 are further configured for triggering or activating the second actuator system for executing the second safety function $F_2$, in case the input evaluation means 10 determine a malfunction and/or unavailability of the second safety device 7 and function and availability of the first safety device 6, if the first hazard detection means or first safety device 6 does detect a hazard in the first safety zone $Z_1$.

The activation means 9 are further configured for logic triggering the machine 2 for transition into a safe state, i.e. emergency stop for example, if the input evaluation means 10 determine malfunction and/or unavailability of the first and the second safety devices 6, 7.

In the following, the concept of hierarchical safety control as it is applied in the safety control system according to the invention will be explained.

A typical hazard event is that a human enters a defined zone where an operating machine may harm the human seriously. Traditionally, if such an event is detected, the machine is stopped. However, the severity of such a hazard can be differently so that sometime the machine can run at a reduced speed instead of stopping, so that the overall productivity of the machine is enhanced significantly.

Figure 3:
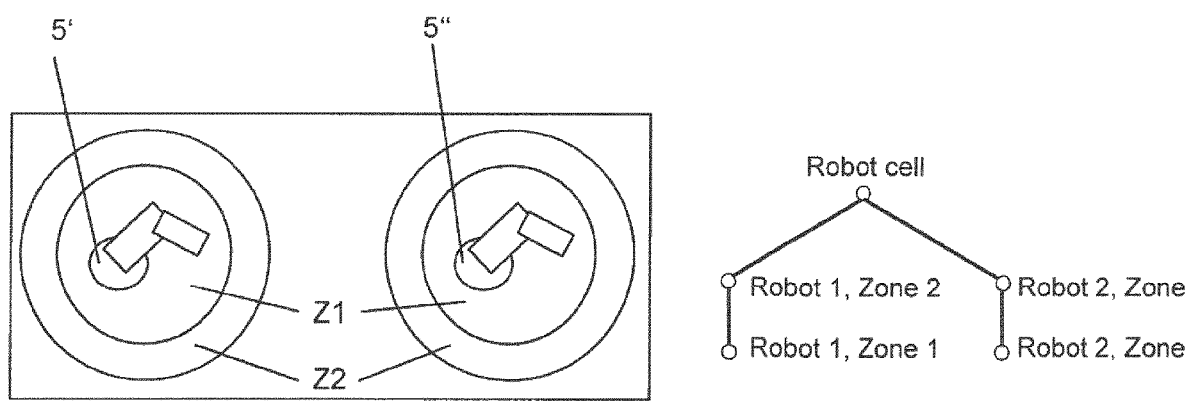
FIG. 3 shows an example of hierarchical safety zone for a robot cell.

For example see FIG. 2 or 3, one can define a first critical safety zone $Z_1$ around a machine 2 or a machine arrangement 5, an industrial robot for example, where the violation of this zone leads to stopping the robot immediately, but if the human is in the neighborhood outside this zone $Z_1$, the robot can run at a reduced speed, so that the robot is able to stop, when the human enters zone $Z_1$.

Figure 4:
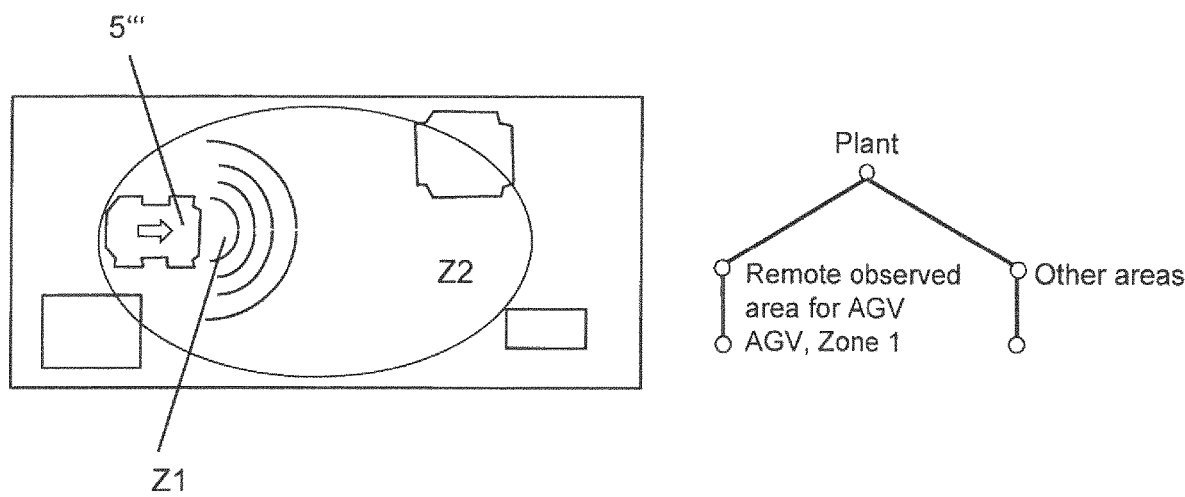
FIG. 4 shows an example with hierarchical safety zone for AGV.

Another example could be an AGV, see FIG. 4, which could run with reduced speed, if obstacles or a human worker is within a certain, but larger range $Z_2$, and it stops, when the distance becomes critical, like zone $Z_1$ in the above example as shown in FIG. 4.

In a more general manner, the safety reaction can also depend on more accurate sensing of position, size and velocity of human or obstacles. And the safety reaction can also be stopping certain part of a production line, running on variable speed with parts of the line etc.

All these lead to a hierarchical safety control scheme that is beneficial in terms of enhanced productivity while ensuring the same safety level.

In a simplified and generalized manner, we assume the following scenario:

$D_1$:=Safety device 1
$H_1$:=Localized hazard event, to be detected by $D_1$
$F_1$:=(Safety) Function 1 (e.g. safe stop)
$P_1$:=Productivity when operating with $F_1$
$D_2$:=Safety device 2
$H_2$:=Less-localized hazard event, to be detected by $D_2$
$F_2$:=(Safety) Function 2 (e.g. reduced speed)
$P_2$:=Productivity when operating with $F_2$
with
$100\% = P_N > P_2 > P_1 \geq P_0 = 0$
and
$H_1$ is subset of $H_2$
which means that $H_1$ is of the same kind like $H_2$, and is covered by $H_2$, but is more localized or detailed.

In the robot example, FIG. 3 or 2, $D_1$ would be a local sensor protecting the work space of the robot, and $D_2$ a sensor observing the neighborhood. And with the AGV example, $D_1$ could be a local sensor (e.g. laser scanner) sensing the front area ahead, and $D_2$ a remote camera observing the work cell.

The safety control logic would be:

```
If H₁ then
    F₁ // Productivity P₁
Else
    If H₂ then F₂ // Productivity P₂
End If
```

Figure 5:
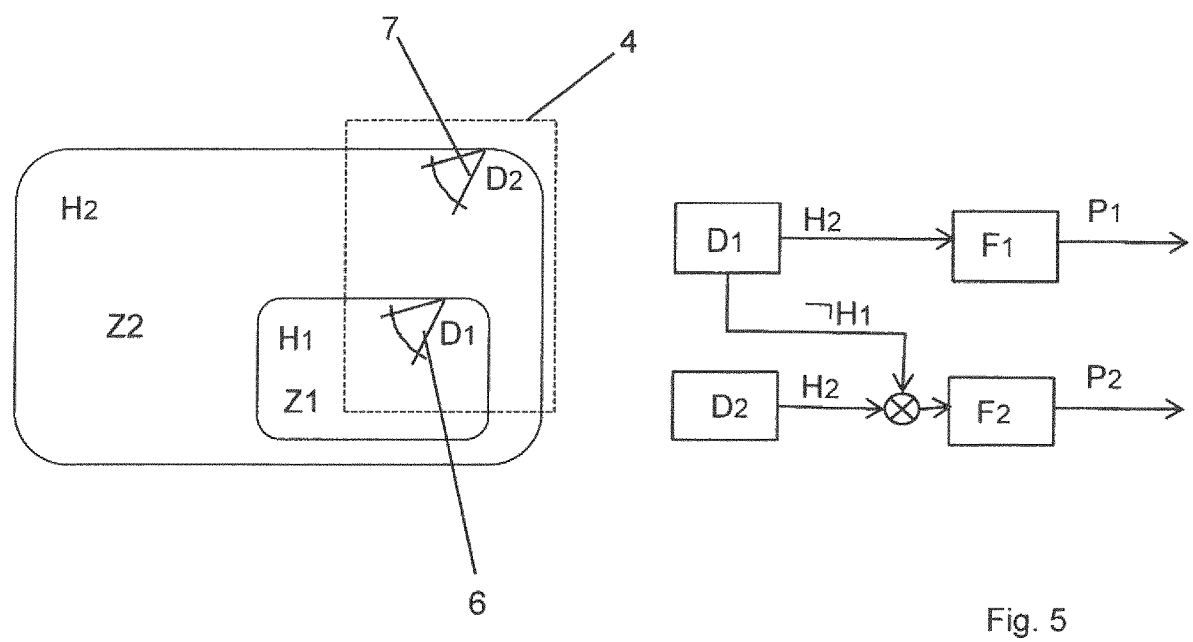
FIG. 5 shows schematically the generalized scenario of a safety control system with basic safety logic.

FIG. 5 illustrates this generalized scenario with corresponding basic safety logic, where any detected or implied safety device faults lead to E-Stop. The corresponding safety control implementation may follow the rules below:

| $D_1$ status | $H_1$ detected | $D_2$ status | $H_2$ detected | $F_x$ | $P_x$ | Comment |
|---|---|---|---|---|---|---|
| OK | false | OK | false | — | $P_N$ | No safety action |
| OK | false | OK | true | $F_2$ | $P_2$ | e.g. reduced speed |
| OK | true | OK | true | $F_1$ | $P_1$ | e.g. lower speed or stop |
| OK | true | OK | false | $F_E$ | $P_0$ | E-Stop, inconsistent with "$H_1$ is subset of $H_2$" |

-continued

| $D_1$ status | $H_1$ detected | $D_2$ status | $H_2$ detected | $F_x$ | $P_x$ | Comment |
|---|---|---|---|---|---|---|
| NOK | any | OK | any | $F_E$ | $P_0$ | E-Stop |
| OK | any | NOK | any | $F_E$ | $P_0$ | E-Stop |
| NOK | any | NOK | any | $F_E$ | $P_0$ | E-Stop |

NOK means either malfunction or unavailability of the safety device due to any reason, including temporary communication error.

In the following, the concept of fail-over as it is applied in the safety control system according to the invention will be explained.

Failover, general speaking, means switching to a redundant device or function, when a dedicated device or function fails.

As described above, in case, $H_1$ cannot be detected due to malfunction of $D_1$ or other reasons, e.g. communication error, it would cause the activation of emergency stop $F_e$, running the machine with $P_0$. After $F_e$, the system must undergo error diagnostics and recovery, and must be restarted. The average time period for this process would be $T_e$.

But in case of temporary unavailability of the device, thus, if the device's function recovers after an acceptable time period without the need to manually repair and restart the system, one can try to bridge this time period by using redundant devices or functions.

Assume that $H_1$ is covered indirectly by $H_2$, thus $H_1$ is subset of $H_2$. It is then possible to change the logic using $D_2$ as failover device of $D_1$, like this:

```
If (D₁ is OK) then
    If H₁ then
        F₁ // Productivity P₁
    Else
        If H₂ then
            F₂ // Productivity P₂
        End If
    Else
    If H₂ then
        F₁ // Productivity P₁
    End If
```

In this case, the machine would run at 100%, if no safety zone violation is detected. Thus, if $D_1$ is not working, the safety control remains intact with switching of ($H_2$ implies $F_2$) to ($H_2$ implies $F_1$), running at 100% if no safety zone violation, or at least with $P_1$, when $H_2$. The productivity is lower than with $D_1$ working, but higher compared with always stopping the machine, if $D_1$ is not working.

In case $D_2$ is at least temporarily, not available, the situation is slightly different: $H_2$ is only partially covered by $H_1$, and $D_1$ cannot be used as failover device to detect $H_2$. However, we can use $F_2$ as failover function for ($D_2$ is NOK) in combination with $H_1$ then $F_1$, thus activate $F_2$ once $D_2$ is NOK, and activate $F_1$, when $H_1$ is detected by $D_1$. Because of $H_1$ is subset of $H_2$, $H_2$ is sufficiently considered with this failover strategy.

| $D_1$ status | $H_1$ detected | $D_2$ status | $H_2$ detected | $F_x$ | $P_x$ | Comment |
|---|---|---|---|---|---|---|
| OK | false | OK | false | — | $P_N$ | No safety action |
| OK | false | OK | True | $F_2$ | $P_2$ | e.g. reduced speed |

-continued

| $D_1$ status | $H_1$ detected | $D_2$ status | $H_2$ detected | $F_x$ | $P_x$ | Comment |
|---|---|---|---|---|---|---|
| OK | true | OK | True | $F_1$ | $P_1$ | e.g. lower speed or stop |
| OK | true | OK | false | $F_E$ | $P_0$ | Inconsistent with $H_1$ is subset of $H_2$ |
| NOK | any | OK | false | — | $P_N$ | Failover to ($D_2$, $H_2$->$F_1$) |
| NOK | any | OK | true | $F_1$ | $P_1$ | Failover to ($D_2$, $H_2$->$F_1$) |
| OK | false | NOK | any | $F_2$ | $P_2$ | Failover to ($D_2$ NOK)->$F_2$ |
| OK | true | NOK | any | $F_1$ | $P_1$ | $H_2$ considered with $H_1$ is subset of $H_2$ |
| NOK | any | NOK | any | $F_E$ | $P_0$ | E-Stop |

In the following, a sample scenario is described in which the failure situation is a CRC (cyclic redundancy check) error. In the sample scenario it is assumed that the safety device $D_1$ is connected remotely via PROFINET (with PROFIsafe protocol), temporary communication errors like CRC or Watchdog errors can occur, which in the current practice lead to emergency stop of the system. In the following, it is described how the failover concept can be applied to such scenarios.

Actually, failover is just a temporary solution to keep the machine running until the partial failure is recovered. Typically, if a safety device fails, manual intervention is needed to recover the failure, e.g. replace the device and restart the safety control. But in some cases, the failure is just temporary.

In this scenario, a closer look is taken at CRC errors, which are typical examples for temporary failures of the communication to the safety device. CRC errors can be detected by the safety controller. According to state of the art before the present invention, an occasional single CRC error would cause an emergency stop, if no additional measure is implemented to cover this situation in the safety protocol implementation.

But in most cases, CRC errors disappear after a short time period, and a stable communication with the device is established again. In such a situation, when above described failover concept is applied, the system does not have to be stopped with a single CRC error, since there is a redundant safety device, and can recover itself automatically by switching back to the normal safety functions, when the next telegram becomes valid, see FIG. 6.

Figure 6:
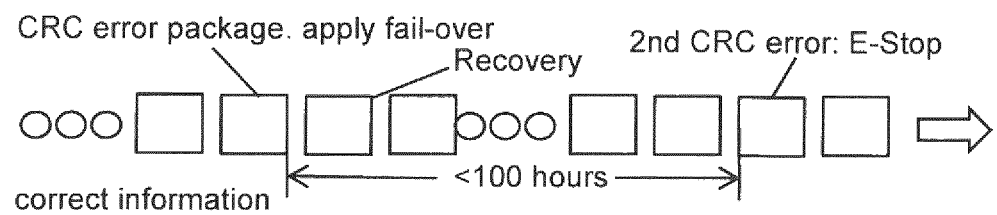
FIG. 6 shows a scheme of failover and recovery for CRC errors

Multiple CRC errors within a defined time interval are interpreted as a serious failure, in which case the machine must be stopped, see also FIG. 6. The commonly applied time interval for detection of CRC error accumulation is currently 100 hours.

A CRC error can be detected by proofing the check-sum. Therefore, the safety controller registers the communication failure and interprets it as a malfunction of the corresponding safety device, if CRC errors appear repeatedly.

In case of failure of the safety device itself, automatic recovery is unfortunately not possible. The safety control must be restarted.

In the following, a sample scenario is described in which the failure situation is a watchdog error.

Another typical example for a temporary communication error are watchdog errors. These errors can happen each minute or even more often, depending on the parameters used. The watchdog time defines the compromise between safety function response time and availability. The smaller the watchdog time is set, coming closer to the black channel performance, the higher is the probability that one may have to stop the machine because of a sudden black channel performance deficiency.

In the current state of the art practiced before the invention was made, there is no limitation on the occurrence frequency of a Watchdog error. But one would stop each time, similar to a CRC fault, if nothing is done to handle this on the application level.

A fail-over concept for the Watchdog error according to the present invention is particularly beneficial for automatic guided vehicles (AGV) in automatic storage handling systems. Such AGVs are very often connected through wireless networks and controlled from the central location.

In case that the wireless connection is suddenly too slow, by a disturbance or a blocking wall impairing data transfer, etc., then the AGV control system loses communication to the central station and flags a Watchdog error because the communication via wireless connection is too slow. One could start a timer instead of stopping the AGV in case of a Watchdog error. If within, e.g. 3 seconds the communication is not back and running, the AGV is stopped. Otherwise, it uses the local safety sensors, e.g. a laser scanner, as failover devices.

In this scenario, the local sensor is $D_1$, equivalent to the first safety device 6, which detects presence of obstacles or humans in the immediate front of the vehicle, and triggers a controlled stop. Furthermore $D_2$, equivalent to the second safety device 7, observes the larger area and is connected via wireless communication to the local AGV control. If $D_2$ is temporarily unavailable, the local AGV can switch to reduced speed and rely on the local sensor for an acceptable time period.

Of course, the concrete implementation of safety control with failover of devices or functions must take all aspects into consideration, which have impact on the achievable safety rating.

FIG. 7 a-c shows a schematic representation of an embodiment of the invention in different failure situations, as example for a preferred embodiment of the control system according to the present invention.

Figure 7A:
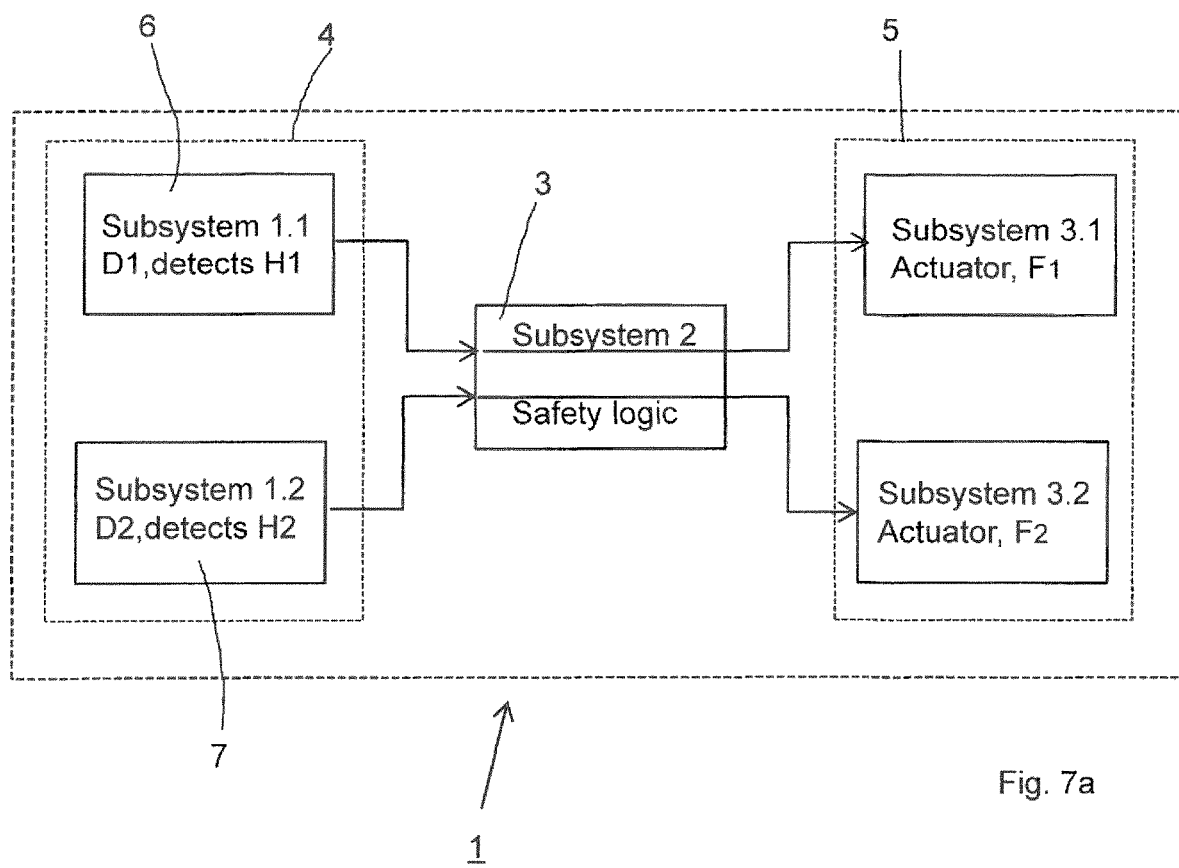
FIG. 7a-c show a schematic representation of an embodiment of the invention in different failure situations.
Figure 7B:
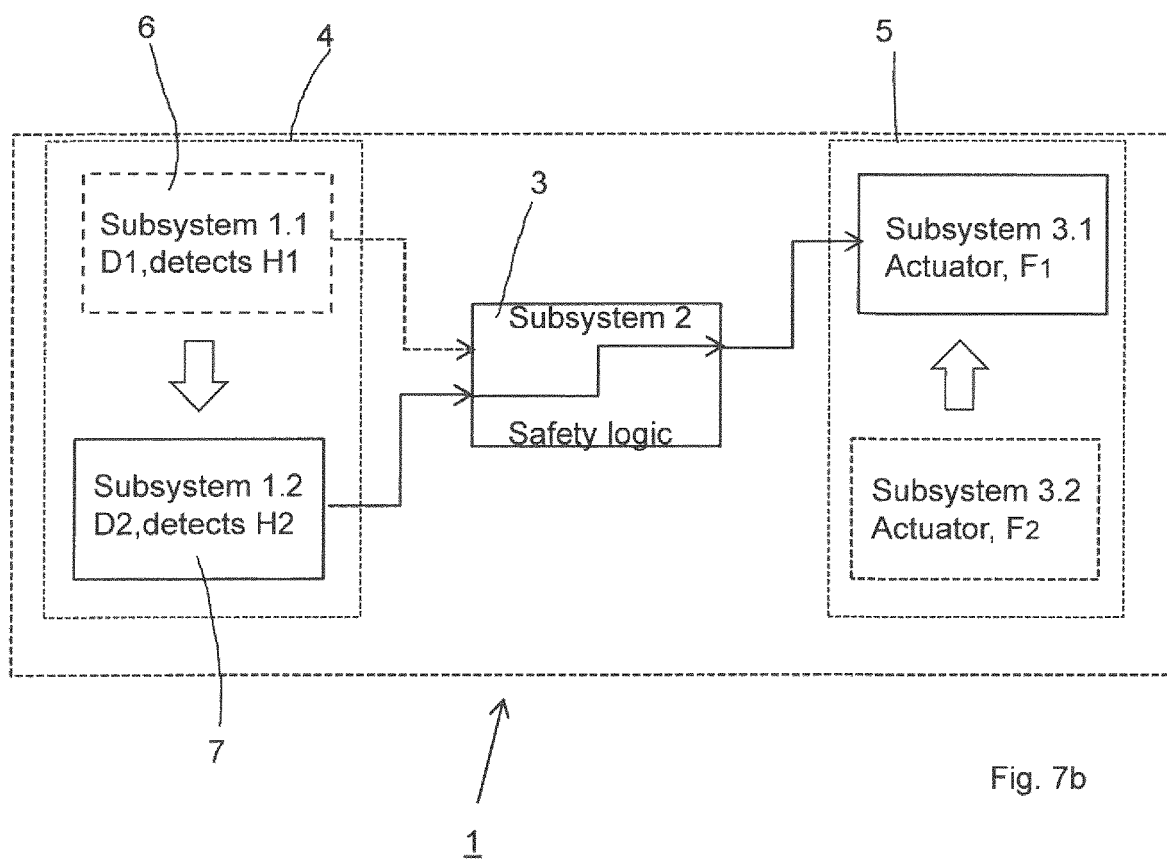
Figure 7C:
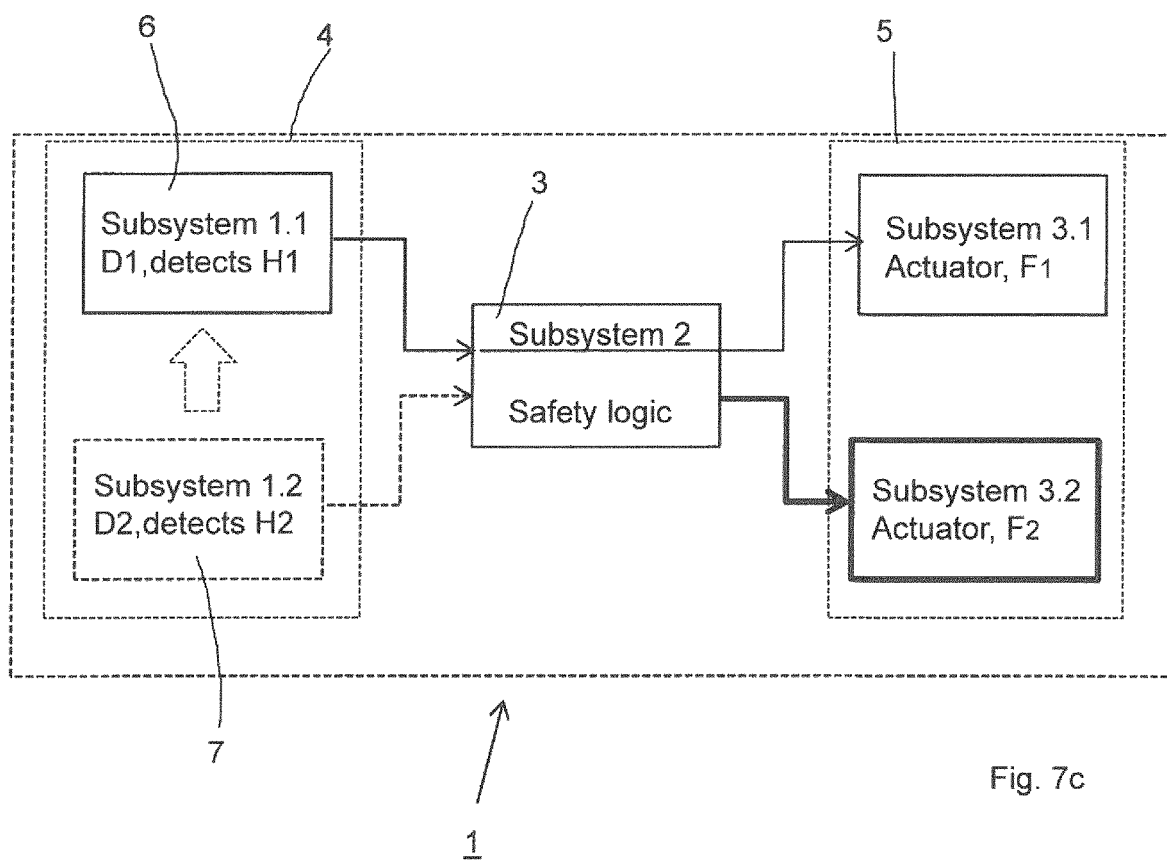

FIG. 7a shows in a schematic and exemplarily way, a safety control system 1, similar to the one shown in FIG. 1. FIGS. 7a-c illustrate the method for operating a safety control system according to the invention. FIG. 7a shows the situation where both safety sensor subsystems 6, 7 are available and functioning.

In case the first safety sensor subsystem 6, $D_1$, detects a hazard situation, $H_1$, in zone $Z_1$, the more safety critical zone, then the safety logic in the control unit 3 activates the machine arrangement 5, the respective actuator, into the first mode of operation $F_1$ with strongly reduced productivity $P_1$, $F_1$ and $P_1$ as defined and explained above.

In case the second safety sensor subsystem 7, $D_2$, detects a hazard situation, $H_2$, in zone $Z_2$, which includes Z1 by the way as Z1 is a subunit of Z2, the less safety critical zone, then the safety logic in the control unit 3 activates the machine arrangement 5, the respective actuator, into the second mode of operation $F_2$ with less strongly reduced productivity $P_2$, $F_2$ and P2 as defined and explained above.

FIG. 7b shows the situation where the safety sensor subsystem 6 is not available, symbolized by the dashed lines, but safety sensor subsystem 7 is available. In this scenario there is application of failover of $D_1$ to $D_2$ with failover from $F_2$ to $F_1$. This means, in case the second safety sensor subsystem 7, $D_2$, detects a hazard event, the safety logic in the control unit 3 activates the machine arrangement 5, the respective actuator, into the first mode of operation $F_1$ with strongly reduced productivity $P_1$. This is a failover in the sense that for safety reasons the more restrictive safety function $F_1$ is applied for a hazard situation detected by subsystem $D_2$ which is observing the less critical safety zone $Z_2$. But as $Z_2$ includes $Z_1$, it might be that the hazard situation detected by $D_2$ has occurred in safety zone $Z_1$, and so it is in the sense of safety control useful to activate the more restrictive safety function $F_1$. So as a failover the combination subsystem 1.2-2, 3.1 or 7-$F_1$ comes to place.

FIG. 7c shows the situation where the safety sensor subsystem 7, $D_2$, is not available, symbolized by the dashed lines, but safety sensor subsystem 6, $D_1$, is available. In case of unavailability of $D_2$, there is no explicit failover of device function. Instead, the safety function for $H_2$ is taken as a general failover function, i.e., $F_2$ is triggered if ($D_2$ NOK). In other words, if $D_2$ is NOK, then $F_2$ is triggered, reducing speed and productivity from $P_0$ to $P_2$, even if $D_1$ does not detect a hazard situation, for safety and precaution reasons. If then in addition $D_1$ detects a hazard situation in zone $Z_1$, then $F_1$ is triggered, further reducing speed and productivity to $P_1$.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 1 safety control system
1' safety control system
3 control unit
4 safety sensor arrangement
5 machine arrangement
6 first safety sensor subsystem $D_1$
7 second safety sensor subsystem $D_2$
8 information indicating availability of subsystem
8' information indicating availability of subsystem
9 activation means
10 input evaluation means
11 functional block/functional subsystem
12 functional block/functional subsystem
13 functional block/functional subsystem
14 functional block/functional subsystem
15 first signal input line 16 second signal input line
Z1 first, critical safety zone
Z2 second, less critical safety zone

The invention claimed is:

1. A safety control system, comprising:
a control unit including safety control logic;
a safety sensor arrangement;
a machine arrangement operable in different modes of operation, wherein each mode of operation includes a different productivity of the machine arrangement,
wherein the control unit is configured to receive and evaluate input from the safety sensor arrangement, and, in reaction to a result of the evaluation activates at least one of the modes of operation of the machine arrangement as determined by the safety control logic,
wherein the safety sensor arrangement includes a first and a second subsystem, which are functionally redundant,
wherein input to the control unit includes information indicating availability of the functionally redundant subsystems,
wherein the control logic is configured to:
  i. activate a normal mode of operation ($F_N$) characterized by normal productivity ($P_N$) in case the input indicates availability of all functionally redundant subsystems,
  ii. activate a fail-stop mode ($F_0$) of operation characterized by zero productivity ($P_0$) in case the input indicates unavailability of all functionally redundant subsystems, and
  iii. activate a fail-operate mode ($F_1$, $F_2$) of operation with productivity less than normal but above zero in case input indicates at least temporary unavailability of at least one and availability of at least another one of the functionally redundant subsystems;
the safety control system further comprising a first safety zone and a second safety zone, the first safety zone being a subset of the second safety zone;
wherein the machine arrangement includes the nominal productivity ($P_N$)
wherein the first functionally redundant subsystem is configured to detect a first hazard event in the first safety zone,
wherein the second functionally redundant subsystem is configured to detect a second hazard event in the second safety zone,
wherein a first fail-operate mode ($F_1$) results in a first reduced machine productivity ($P_1$) greater than zero but smaller than the normal productivity ($P_N$), and a second fail-operate mode ($F_2$) results in a second reduced machine productivity ($P_2$) greater than zero but smaller than the nominal productivity ($P_N$) and higher than the first reduced machine productivity ($P_1$),
wherein the control logic activates the second fail-operate mode ($F_2$) in case input to the control logic indicates availability of both functionally redundant subsystems and indicates the second hazard event in the second safety zone but no first hazard event in the first safety zone, and
wherein the control logic activates the first fail-operate mode ($F_1$) in case input to the control logic indicates a temporarily unavailability of the first functionally redundant subsystem but availability of the second functionally redundant subsystem and indicates the second hazard event in the second safety zone.

2. The system of claim 1, wherein the control logic activates the second fail-operate mode ($F_2$) in case input to the control logic indicates availability of the first functionally redundant subsystem and at least temporary unavailability of the second redundant subsystem and indicates no first hazard event in the first safety zone.

3. The system of claim 1, wherein the control logic activates the first fail-operate mode ($F_1$) in case input to the control logic indicates at least temporary unavailability of the second redundant subsystem and indicates the first hazard event in the first safety zone.

4. The system of claim 1, wherein the control logic activates the first fail-operate mode ($F_1$) in case input to the control logic indicates availability of both the first and second redundant subsystems and indicates the first and/or second hazard event in both the first and second safety zones.

5. The system of claim 1, wherein the control logic activates the normal mode of operation ($F_N$) in case input to the control logic indicates availability of the second redundant subsystem and temporary unavailability of the first redundant subsystem and no hazard event in the second safety zone.

6. The system of claim 1, wherein the machine or arrangement is a robot or an Autonomous Guided Vehicle or a discrete manufacturing system or a manufacturing cell.

7. The system of claim 1, wherein the productivity of the machine or arrangement is a speed of moving parts of the machine or arrangement.

8. The system of claim 1, wherein the first or the second redundant subsystem includes a proximity sensor.

9. The system of claim 1, wherein the first or the second redundant subsystem includes a light barrier or a laser scanner or a camera.

10. The system of claim 1, wherein the first or the second redundant subsystem includes a laser scanner or a camera.

11. The system of claim 1, wherein the first or the second redundant subsystem includes a camera.

12. The system of claim 1, wherein the first or the second redundant subsystem is a proximity sensor or a light barrier or a laser scanner or a camera.

13. The system of claim 1, wherein temporary unavailability of a functionally redundant subsystem is caused by a temporary communication error.

14. A method of operation of a safety control system, the system having at least a control unit with safety control logic, a safety sensor arrangement, a machine arrangement operable in different modes of operation, wherein each mode of operation includes a different productivity of the machine arrangement, the control unit being configured to receive and evaluate input from the at least one safety sensor arrangement, and, in reaction to the result of the evaluation activate a mode of operation of the machine arrangement as determined by the safety control logic,
the at least one safety sensor arrangement having at least two functionally redundant subsystems, and input to the control unit including information indicating availability of the at least two functionally redundant subsystems, the method comprising:
activating a normal mode of operation ($F_N$) characterized by normal productivity ($P_N$) in case the input indicates availability of all functionally redundant subsystems;
activating a fail-stop mode ($F_0$) of operation characterized by zero productivity ($P_0$) in case the input indicates unavailability of all functionally redundant subsystems;
activating a fail-operate mode ($F_1$, $F_2$) of operation with productivity less than normal but above zero in case input indicates at least temporary unavailability of at least one and availability of at least another one of the functionally redundant subsystems;

the safety control system further comprising a first safety zone and a second safety zone, the first safety zone being a subset of the second safety zone;

wherein the machine arrangement includes the nominal productivity ($P_N$)

wherein the first functionally redundant subsystem is configured to detect a first hazard event in the first safety zone, wherein the second functionally redundant subsystem is configured to detect a second hazard event in the second safety zone, wherein a first fail-operate mode ($F_1$) results in a first reduced machine productivity ($P_1$) greater than zero but smaller than the normal productivity ($P_N$), and a second fail-operate mode ($F_2$) results in a second reduced machine productivity ($P_2$) greater than zero but smaller than the nominal productivity ($P_N$) and higher than the first reduced machine productivity ($P_1$), wherein the control logic activates the second fail-operate mode ($F_2$) in case input to the control logic indicates availability of both functionally redundant subsystems and indicates the second hazard event in the second safety zone but no first hazard event in the first safety zone, and wherein the control logic activates the first fail-operate mode ($F_1$) in case input to the control logic indicates a temporarily unavailability of the first functionally redundant subsystem but availability of the second functionally redundant subsystem and indicates the second hazard event in the second safety zone.

15. The method of claim 14, comprising:

with the control logic, activating the second fail-operate mode ($F_2$) in response to the control logic indicating: availability of the first functionally redundant subsystem, at least temporary unavailability of the second redundant subsystem, and no first hazard event in the first safety zone.

16. The method of claim 14, comprising:

with the control logic, activating the first fail-operate mode ($F_1$) in response to the control logic indicating at least temporary unavailability of the second redundant subsystem and indicating the first hazard event in the first safety zone.

17. The method of claim 14, comprising:

with the control logic, activating the first fail-operate mode ($F_1$) in response to input to the control logic indicating availability of both the first and second redundant subsystems and indicating the first and/or second hazard event in both the first and second safety zones.

18. The method of claim 14, comprising:

with the control logic, activating the normal mode of operation ($F_N$) in response to input to the control logic indicating: availability of the second redundant subsystem, temporary un-availability of the first redundant subsystem, and no hazard event in the second safety zone.

19. The method of claim 14, wherein the machine arrangement is a robot or an Autonomous Guided Vehicle or a discrete manufacturing system or a manufacturing cell.

20. The method of claim 14, wherein the productivity of the machine arrangement is a speed of moving parts of the machine arrangement.

* * * * *